(12) United States Patent
Adam et al.

(10) Patent No.: US 10,318,924 B2
(45) Date of Patent: Jun. 11, 2019

(54) USER INTERFACE DATE SELECTORS FOR HISTORICAL REPORTS

(71) Applicant: salesforce.com, inc., San Francisco, CA (US)

(72) Inventors: Abraham Adam, San Francisco, CA (US); Alex Gitelman, Berkeley, CA (US); Daphne A. Kao, San Francisco, CA (US); Eric Nash, San Francisco, CA (US); Harish Bellamane, Bangalore (IN); Michael Tang, Petaluma, CA (US); Stefan Eberl, San Francisco, CA (US); Twisha Mehta, Fremont, CA (US); Venkatachalam Muthukrishnan, Tamilnadu (IN)

(73) Assignee: salesforce.com, inc., San Francisco, CA (US)

( * ) Notice: Subject to any disclaimer, the term of this patent is extended or adjusted under 35 U.S.C. 154(b) by 272 days.

(21) Appl. No.: 14/066,241

(22) Filed: Oct. 29, 2013

(65) Prior Publication Data

US 2014/0173513 A1    Jun. 19, 2014

Related U.S. Application Data

(60) Provisional application No. 61/738,467, filed on Dec. 18, 2012, provisional application No. 61/739,595, filed on Dec. 19, 2012.

(51) Int. Cl.
*G06F 3/0482* (2013.01)
*G06Q 10/10* (2012.01)
*G06Q 10/06* (2012.01)

(52) U.S. Cl.
CPC ......... *G06Q 10/10* (2013.01); *G06Q 10/0639* (2013.01)

(58) Field of Classification Search
CPC ... G06F 3/0482; G06Q 10/0639; G06Q 10/10
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |

(Continued)

OTHER PUBLICATIONS

U.S. Appl. No. 13/986,251, filed Apr. 16, 2013.

*Primary Examiner* — Tan H Tran
(74) *Attorney, Agent, or Firm* — Dergosits & Noah LLP; Todd A. Noah (57) ABSTRACT

Systems and methods are provided for user interface date selectors for historical reports. A user interface outputs a date selector including a calculated dates option, wherein the calculated dates option is based on a date frequency applied to a date range. The user interface receives a selection via the date selector. Dates associated with the selection are identified. The user interface outputs the dates as a preview of a historical report, wherein the dates are output in a chronological order.

16 Claims, 4 Drawing Sheets

(56) References Cited

U.S. PATENT DOCUMENTS

| | | |
|---|---|---|
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0008825 A1* | 1/2004 | Seeley ............... H04M 3/22 379/32.01 |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0090141 A1* | 4/2006 | Loui ............... G06F 17/30064 715/764 |
| 2007/0198802 A1* | 8/2007 | Kavuri ............... G06F 3/0605 711/170 |
| 2007/0271185 A1* | 11/2007 | Engler ............... G06Q 10/10 705/51 |
| 2008/0071467 A1* | 3/2008 | Johnson ............... G08G 1/0104 701/118 |
| 2008/0082578 A1* | 4/2008 | Hogue ............... G06F 17/30864 |
| 2009/0063415 A1 | 3/2009 | Chatfield et al. |
| 2009/0100342 A1 | 4/2009 | Rueben et al. |
| 2009/0177744 A1 | 7/2009 | Marlow et al. |
| 2012/0123924 A1* | 5/2012 | Rose ............... G06Q 20/12 705/35 |
| 2012/0233137 A1 | 9/2012 | Jakobson et al. |
| 2013/0067379 A1* | 3/2013 | Chutkay ............... G06Q 10/00 715/771 |
| 2013/0218948 A1 | 8/2013 | Jakobson |
| 2013/0218949 A1 | 8/2013 | Jakobson |
| 2013/0218966 A1 | 8/2013 | Jakobson |
| 2014/0101010 A1* | 4/2014 | Pedro de Matos .... G06Q 20/00 705/34 |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |

* cited by examiner

Frequency Quarterly ▼   Period This Year

208 — Preview   Tabular Format ▼   Show ▼   Remove All Columns

Amount (Historical)

3/31/2012   6/30/2012   9/30/2012

202

210

Filters   Add ▼
Show   My opportunities ▼
Date Field   Close Date ▼   Range   Current FQ ▼   From 10/1/2012   To 12/31/2012
Frequency   Daily ▼   Period   10/26/2012   10/27/2012   10/28/2012

To add filters, click Add.

214   212

Preview   Tabular Format   Show ▼   Remove All Columns

Amount (Historical)

| Opportunity Name | 10/26/2012 | 10/27/2012 | 10/28/2012 | Amount |
|---|---|---|---|---|
| Opportunity 1 | | | | USD 1,100.00 |
| Opportunity 2 | USD 300.00 | USD 300.00 | USD 300.00 | USD 330.00 |

This preview shows a limited number of records. Run the report to see all results.

USER INTERFACE DATE SELECTORS FOR HISTORICAL REPORTS

CLAIM OF PRIORITY

This application claims the benefit of U.S. Provisional Patent Application No. 61/738,467 entitled SIDE BY SIDE HISTORICAL REPORTS WITH A DATE CHANGE PRESENTATION UI, by Abraham, et al., filed Dec. 18, 2012, and U.S. Provisional Patent Application No. 61/739,595 entitled COMPONENT TO ALLOW USERS TO PICK DATES AND PREDEFINED DATES, by Abraham, et al., filed Dec. 18, 2012, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

User Interface Date Selectors for Historical Reports

One or more implementations relate generally to user interface date selectors for historical reports.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In computer science, an object is a location in memory having a value and referenced by an identifier. Since the introduction of object-oriented programming, an object can refer to a particular instance of a class, and can include multiple fields that have their corresponding values. Relational database management systems may track historical changes to data objects to provide additional information to system users. For example, a salesperson who stores sales opportunity information using a database management system may benefit from accessing the history of the sales opportunity information for a prospective customer, such as changes to the sales opportunity amounts and the sales opportunity scheduled sales dates during the last year. On Friday morning September 13th, the salesperson accesses the database management system to determine what were the potential sales amount and the scheduled sales date for all of the salesperson's sales opportunities during the present month.

The prior art user interface for the database management system permits the user to select either fixed dates or relative dates, such as the last day of each week or each day of the month. The weekly report would provide the requested data for the end of the day on Friday September $6^{th}$, which is not enough dates for the salesperson, while the daily report would provide the requested data for the end of the day on September $1^{st}$, $2^{nd}$, $3^{rd}$, $4^{th}$, $5^{th}$, $6^{th}$, $7^{th}$, $8^{th}$, $9^{th}$, $10^{th}$, $11^{th}$, and $12^{th}$, which is too many dates for the salesperson. If the salesperson wants a report with a number of dates between the number of dates provided by the weekly report and the number of dates provided by the daily report, the prior art user interface for the database management system permits the user to select fixed dates, such as identifying each date individually, which in many situations could become a time consuming process that may result in errors and/or user frustration.

BRIEF SUMMARY

In accordance with embodiments, there are provided systems and methods for user interface date selectors for historical reports. A user interface outputs a date selector including a calculated dates option, wherein the calculated dates option is based on a date frequency applied to a date range. For example, the user interface outputs a date frequency field and a date range field. The user interface receives a selection via the date selector. For example, the user interface receives the selection of an every third day frequency and a date range of the current month. Dates associated with the selection are identified. For example, the system calculates the selected days to be September $3^{rd}$, $6^{th}$, $9^{th}$, and $12^{th}$. The user interface outputs the dates as a preview of a historical report, wherein the dates are output in a chronological order. For example, the user interface outputs a preview of a historical report that includes the dates September $3^{rd}$, $6^{th}$, $9^{th}$, and $12^{th}$. Accordingly, systems and methods are provided which enable a database system to improve the performance, efficiency, and the ease of use of selecting dates for historical reports.

While one or more implementations and techniques are described with reference to an embodiment in which user interface date selectors for historical reports are implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 2 is a screen shot illustrating frames of an example user interface screen of a display device supporting methods for user interface date selectors for historical reports;

DETAILED DESCRIPTION

General Overview

Systems and methods are provided for user interface date selectors for historical reports.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for user interface date selectors for historical reports will be described with reference to example embodiments.

The following detailed description will first describe a method for user interface date selectors for historical reports.

Next, a screen shot illustrating frames of an example user interface screen is described.

Figure 1:
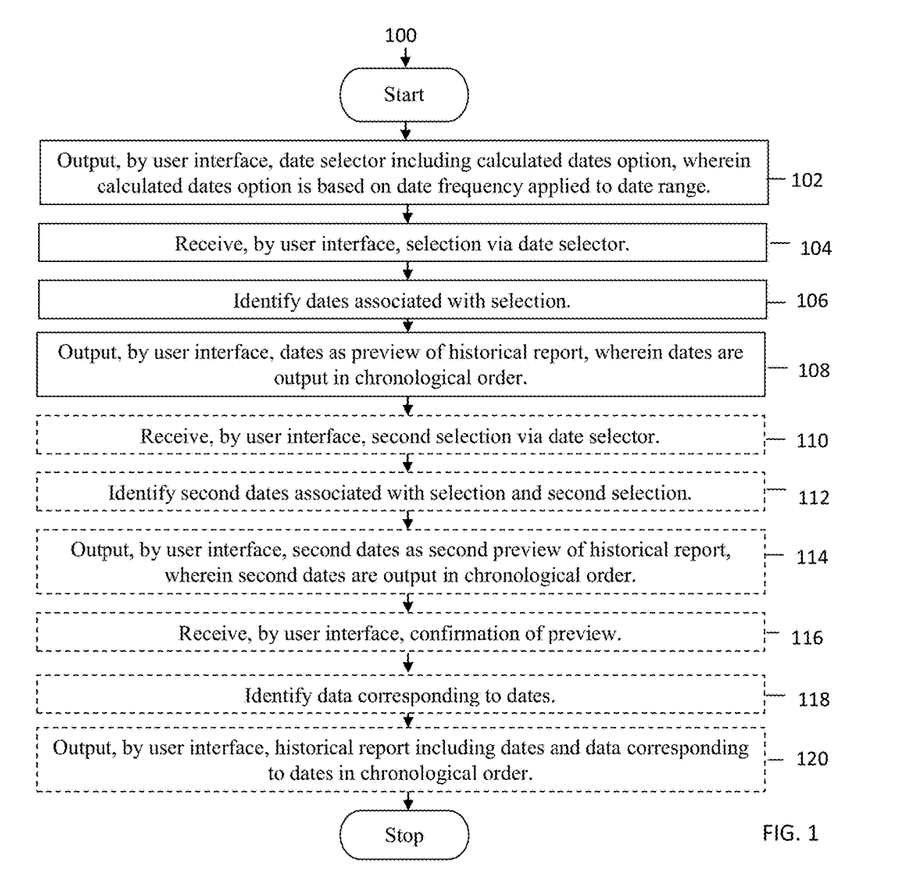
FIG. 1 is an operational flow diagram illustrating a high level overview of a method for user interface date selectors for historical reports in an embodiment.

FIG. 1 is an operational flow diagram illustrating a high level overview of a method 100 for user interface date selectors for historical reports in an embodiment. As shown in FIG. 1, a database system can improve the performance, efficiency, and the ease of use of selecting dates for historical reports.

In block 102, a user interface outputs a date selector including a calculated dates option, wherein the calculated dates option is based on a date frequency applied to a date range. For example and without limitation, this can include the database system's user interface outputting a date frequency field and a date range field. The date frequency and the date range may be predefined and/or user configurable. For example, the date frequency may initially display a default option of daily and the date range may initially default to the current month. In another example, the salesperson may create the day frequency of every 19 days and create a date range of the previous 97 days. The user interface may also include a fixed date option and a relative date option. For example, the user interface may enable a salesperson to individually select specific dates, such as August $1^{st}$. In another example, the user interface may enable the salesperson to select from a variety of relative dates, such as a specified number of days ago, a specified number of weeks ago, the first day of the current week, the first day of the previous week, the first day of a specified number of weeks ago, a specified number of months ago, the first day the current month, and the first day of a specified number of months ago. Any other type of relative dates is also possible.

In block 104, a user interface receives a selection via a date selector. By way of example and without limitation, this can include the database system's user interface receiving a selection of an every third day frequency and a date range of the current month. The selection may include any combination of fixed dates, relative dates, and calculated dates.

In block 106, dates associated with selection are identified. In embodiments, this can include the database system calculating the selected days to be September $3^{rd}$, $6^{th}$, $9^{th}$, and $12^{th}$. The identified dates may include any combination of fixed dates, relative dates, and calculated dates.

In block 108, a user interface outputs dates as a preview of a historical report, wherein the dates are output in a chronological order. For example and without limitation, this can include the database system's user interface outputting a preview of a historical report that includes the dates September $3^{rd}$, $6^{th}$, $9^{th}$, and $12^{th}$. The preview may include no data for the corresponding dates, or include only a first few rows of data for the corresponding dates.

In block 110, a user interface optionally receives a second selection via a date selector. By way of example and without limitation, this can include the database system's user interface receiving the selection of the every third day frequency applied to an expanded date range of the previous 30 days because the salesperson likes the dates displayed in the preview and decides to request more dates using the same frequency.

In block 112, second dates associated with a second selection are optionally identified. In embodiments, this can include the database system calculating the selected days to be August $16^{th}$, $19^{th}$, $22^{nd}$, $25^{th}$, $28^{th}$, and $31^{st}$, in addition to September $3^{rd}$, $6^{th}$, $9^{th}$, and $12^{th}$. If the salesperson attempted to select all of these dates using the fixed date option, not only would the process be time consuming, but the human calculation of dates spanning the end of a month with 31 days could be prone to user error.

In block 114, a user interface optionally outputs second dates as a second preview of a historical report, wherein the second dates are output in a chronological order. For example and without limitation, this can include the database system's user interface dynamically outputting a second preview of a historical report that includes the dates August $16^{th}$, $19^{th}$, $22^{nd}$, $25^{th}$, $28^{th}$, and $31^{st}$, and September $3^{rd}$, $6^{th}$, $9^{th}$, and $12^{th}$. The database system's user interface responds immediately to the second selection by dynamically outputting the second preview. Similar to the first preview, the second preview may include no data for the corresponding dates, or include only a first few rows of data for the corresponding dates.

In block 116, a user interface optionally receives a confirmation of a preview. By way of example and without limitation, this can include the database system's user interface receiving the salesperson's confirmation of the dates listed in the first preview or the second preview as a request for the corresponding historical report.

In block 118, data corresponding to dates are optionally identified. In embodiments, this can include the database system identifying the salesperson's opportunities corresponding to the dates Aug. $16^{th}$, $19^{th}$, $22^{nd}$, $25^{th}$, $28^{th}$, and $31^{st}$, and September $3^{rd}$, $6^{th}$, $9^{th}$, and $12^{th}$. In contrast to the preview, which requires no identification of data or limited identification of data, the database system identifies all of the data for all of the corresponding dates.

In block 120, a user interface optionally outputs a historical report including dates and data corresponding to the dates in a chronological order. For example and without limitation, this can include the database system's user interface outputting a historical report including the salesperson's opportunities corresponding to the dates August $16^{th}$, $19^{th}$, $22^{nd}$, $25^{th}$, $28^{th}$, and $31^{st}$, and September $3^{rd}$, $6^{th}$, $9^{th}$, and $12^{th}$. The database system may output historical reports based on a combination of fixed dates, relative dates, and calculated dates. For example, if the salesperson also selected the fixed date of August $30^{th}$ and the relative date of the first day of the current week, which would be September $8^{th}$, the database system's user interface outputs a historical report including the salesperson's opportunities corresponding to the dates August $16^{th}$, $19^{th}$, $22^{nd}$, $25^{th}$, $28^{th}$, $30^{th}$, and $31^{st}$, and September $3^{rd}$, $6^{th}$, $8^{th}$, $9^{th}$, and $12^{th}$. If a user selected a duplicate date, such as by selecting September $6^{th}$ as a fixed date as well as a calculated date, the database system's user interface can eliminate duplicate dates, such as displaying only one column of the salesperson's opportunity data for September $6^{th}$. The database system may output historical reports based on an alternative chronological order, such as a reverse chronological order that would result in the opportunities listed in an order corresponding to September $12^{th}$, $9^{th}$, $6^{th}$, and $3^{rd}$, and August $31^{st}$, $28^{th}$, $25^{th}$, $22^{nd}$, $19^{th}$, and $16^{th}$.

The historical report may include data corresponding to a current date and an indicator of a relative change between first data corresponding to a first date and second data corresponding to a second date. For example, the historical report also includes the salesperson's opportunity for the current date of September $13^{th}$, and relative change indicators that highlight the data for September $12^{th}$ with a green plus sign because the corresponding opportunity increased from September $9^{th}$ to September $12^{th}$, and highlight the data for September $9^{th}$ with a red minus sign because the corresponding opportunity decreased from September $6^{th}$ to September $9^{th}$. The relative change indicators enable a user to quickly see changes over time. The relative change indicators are user configurable, such that a user may change the colors and the indicator signs that the database system uses to indicate both increases in the corresponding data and decreases in the corresponding data.

The method 100 may be repeated as desired. Although this disclosure describes the blocks 102-120 executing in a particular order, the blocks 102-120 may be executed in a different order.

FIG. 2 is a screen shot illustrating frames 200 and 202 of an example user interface screen of a display device for user interface date selectors for historical reports in an embodiment. The frame 200 may include a frequency selector 204, which indicates a quarterly frequency is selected, a period selector 206, which indicates a period of this year is selected, and a preview section 208, which indicates that the selected frequency applied to the selected ranges results in the dates of June $30^{th}$ and September $30^{th}$ for the requested data, which may indicate that the requested data did not exist yet on March $31^{st}$.

The frame 204 may include a frequency selector 210, which indicates a daily frequency is selected, a period selector 212, which indicates a period of the previous three days is selected, and a preview section 214, which indicates that the selected frequency applied to the selected ranges results in the dates of October $26^{th}$, October $27^{th}$, and October $28^{th}$ for the requested data, in addition to the current date. The dashes in the opportunity 1 row for the previous three days may indicate that the requested data did not exist yet on the three previous days for opportunity 1. If the system user uses an input device to hover over a data field, the database system's user interface may display a change indicator associated with the data field as long as the user is hovering over the data field. For example, if the salesperson hover over the current amount for opportunity 2, the database system's user interface displays a green tooltip that indicates that the amount increased by $30 relative to the previous date's amount.

The frames 200-202 may be part of a larger display screen that includes fields for users to enter commands to create, retrieve, edit, and store records. The database system may output a display screen that includes the frame frames 200-202 in response to a search based on search criteria input via a user interface. Because the frames 200-202 are samples, the frames 200-202 could vary greatly in appearance. For example, the relative sizes and positioning of the text is not important to the practice of the present disclosure. The frames 200-202 can be depicted by any visual display, but is preferably depicted by a computer screen. The frames 200-202 could also be output as a report and printed or saved in electronic format, such as PDF. The frames 200-202 can be part of a personal computer system and/or a network, and operated from system data received by the network, and/or on the Internet. The frames 200-202 may be navigable by a user. Typically, a user can employ a touch screen input or a mouse input device to point-and-click to a location on the frames 200-202 to manage the text on the frames 200-202, such as a selection that enables a user to edit the text. Alternately, a user can employ directional indicators, or other input devices such as a keyboard. The text depicted by the frame frames 200-202 are examples, as the frames 200-202 may include a much greater amount of text. The frames 200-202 may also include fields in which a user can input textual information.

System Overview

Figure 3:
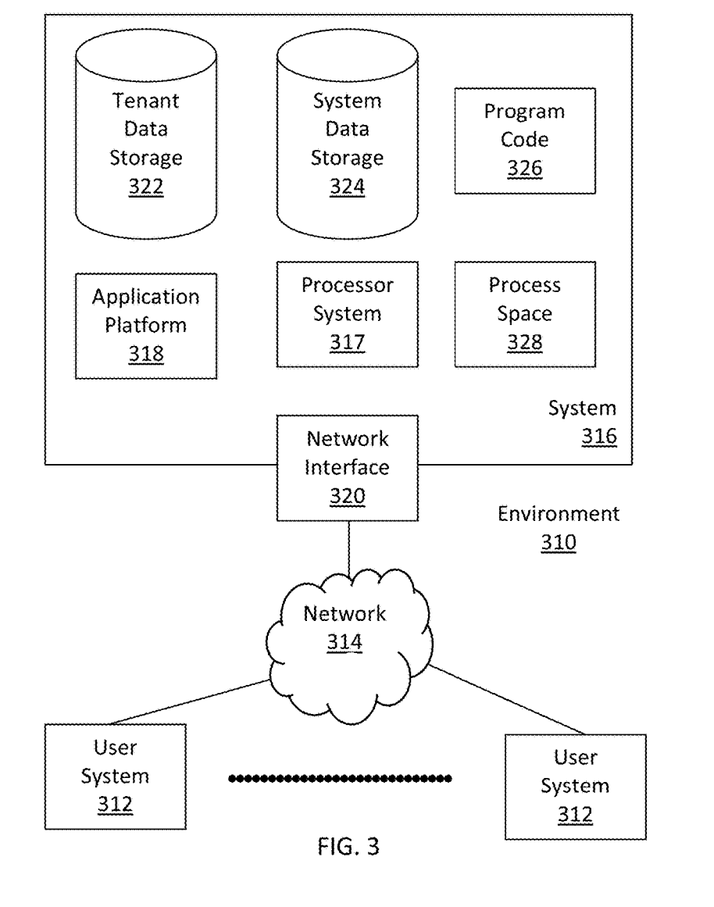
FIG. 3 illustrates a block diagram of an example of an environment wherein an on-demand database service might be used.

FIG. 3 illustrates a block diagram of an environment 310 wherein an on-demand database service might be used. Environment 310 may include user systems 312, network 314, system 316, processor system 317, application platform 318, network interface 320, tenant data storage 322, system data storage 324, program code 326, and process space 328. In other embodiments, environment 310 may not have all of the components listed and/or may have other elements instead of, or in addition to, those listed above.

Environment 310 is an environment in which an on-demand database service exists. User system 312 may be any machine or system that is used by a user to access a database user system. For example, any of user systems 312 can be a handheld computing device, a mobile phone, a laptop computer, a work station, and/or a network of computing devices. As illustrated in FIG. 3 (and in more detail in FIG. 4) user systems 312 might interact via a network 314 with an on-demand database service, which is system 316.

An on-demand database service, such as system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 316" and "system 316" will be used interchangeably herein. A database image may include one or more database objects. A relational database management system (RDMS) or the equivalent may execute storage and retrieval of information against the database object(s). Application platform 318 may be a framework that allows the applications of system 316 to run, such as the hardware and/or software, e.g., the operating system. In an embodiment, on-demand database service 316 may include an application platform 318 that enables creation, managing and executing one or more applications developed by the provider of the on-demand database service, users accessing the on-demand database service via user systems 312, or third party application developers accessing the on-demand database service via user systems 312.

The users of user systems 312 may differ in their respective capacities, and the capacity of a particular user system 312 might be entirely determined by permissions (permission levels) for the current user. For example, where a salesperson is using a particular user system 312 to interact with system 316, that user system has the capacities allotted to that salesperson. However, while an administrator is using that user system to interact with system 316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 312 might communicate with system 316 using TCP/IP and, at a higher network level, use other common Internet protocols to communicate, such as HTTP, FTP, AFS, WAP, etc. In an example where HTTP is used, user system 312 might include an HTTP client commonly referred to as a "browser" for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 316, shown in FIG. 3, implements a web-based customer relationship management (CRM) system. For example, in one embodiment, system 316 includes application servers configured to implement and execute CRM software applications as well as provide related data, code, forms, webpages and other information to and from user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 316 implements applications other than, or in addition to, a CRM application. For example, system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of system 316 is shown in FIG. 3, including a network interface 320, application platform 318, tenant data storage 322 for tenant data 323, system data storage 324 for system data 325 accessible to system 316 and possibly multiple tenants, program code 326 for implementing various functions of system 316, and a process space 328 for executing MTS system processes and tenant-specific processes, such as running applications as part of an application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 312 to access, process and view information, pages and applications available to it from system 316 over network 314. Each user system 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Pentium® processor or the like. Similarly, system 316 (and additional instances of an MTS, where more than one is present) and all of their components might be operator configurable using application(s) including computer code to run using a central processing unit such as processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
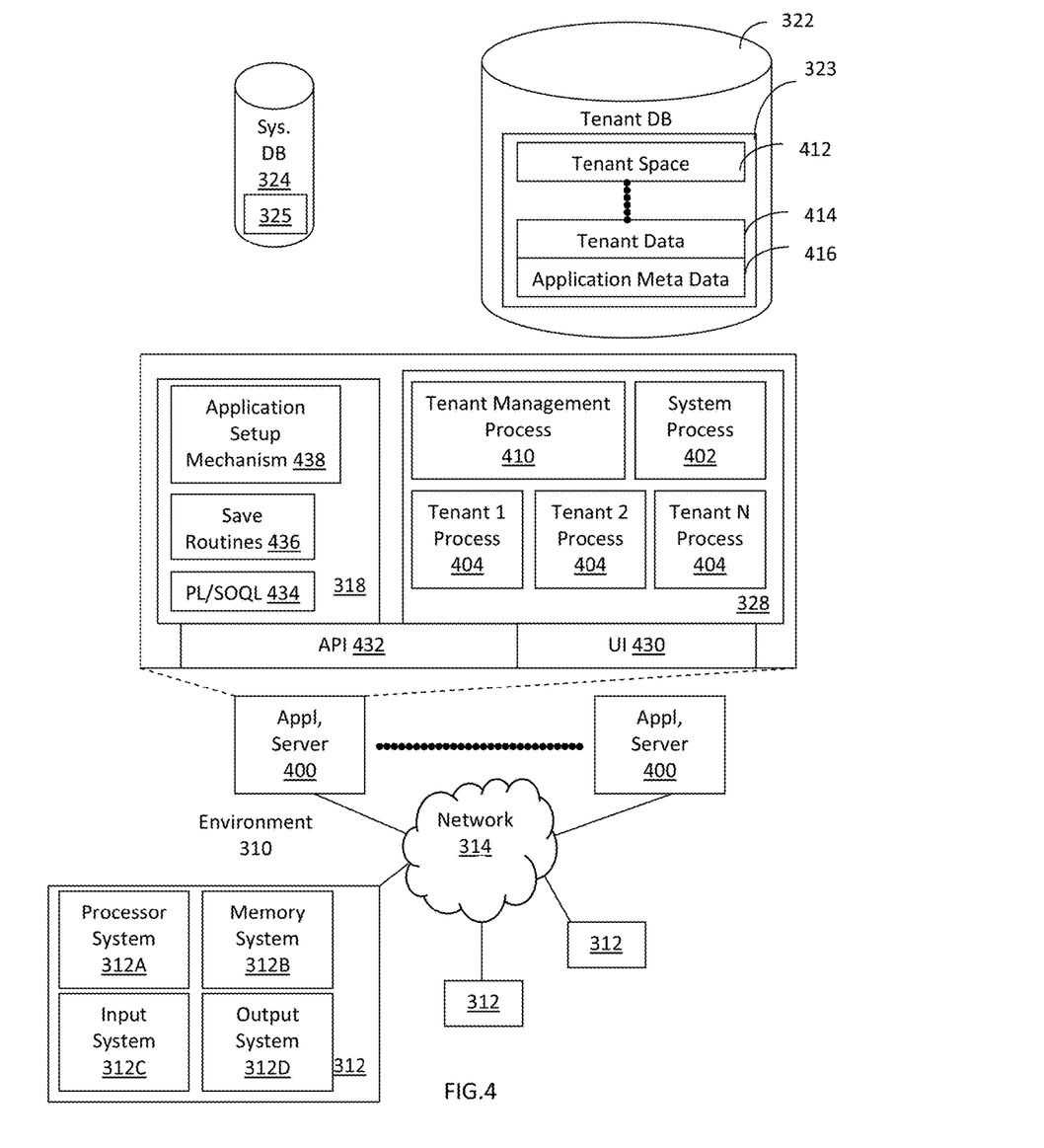
FIG. 4 illustrates a block diagram of an embodiment of elements of FIG. 3 and various possible interconnections between these elements.

FIG. 4 also illustrates environment 310. However, in FIG. 4 elements of system 316 and various interconnections in an embodiment are further illustrated. FIG. 4 shows that user system 312 may include processor system 312A, memory system 312B, input system 312C, and output system 312D. FIG. 4 shows network 314 and system 316. FIG. 4 also shows that system 316 may include tenant data storage 322, tenant data 323, system data storage 324, system data 325, User Interface (UI) 430, Application Program Interface (API) 432, PL/SOQL 434, save routines 436, application setup mechanism 438, applications servers $400_1$-$400_N$, system process space 402, tenant process spaces 404, tenant management process space 410, tenant storage area 412, user storage 414, and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312C may be any combination of input devices, such as one or more keyboards, mice, trackballs, scanners, cameras, and/or interfaces to networks. Output system 312D may be any combination of output devices, such as one or more monitors, printers, and/or interfaces to networks. As shown by FIG. 4, system 316 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410. Each application server 400 may be configured to tenant data storage 322 and the tenant data 323 therein, and system data storage 324 and the system data 325 therein to serve requests of user systems 312. The tenant data 323 might be divided into individual tenant storage areas 412, which can be either a physical arrangement and/or a logical arrangement of data. Within each tenant storage area 412, user storage 414 and application metadata 416 might be similarly allocated for each user. For example, a copy of a user's most recently used (MRU) items might be stored to user storage 414. Similarly, a copy of MRU items for an entire organization that is a tenant might be stored to tenant storage area 412. A UI 430 provides a user interface and an API 432 provides an application programmer interface to system 316 resident processes to users and/or developers at user systems 312. The tenant data and the system data may be stored in various databases, such as one or more Oracle™ databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process 410 for example. Invocations to such applications may be coded using PL/SOQL 34 that provides a programming language style interface extension to API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving application metadata 416 for the subscriber making the invocation and executing the metadata as an application in a virtual machine.

Each application server 400 may be communicably coupled to database systems, e.g., having access to system data 325 and tenant data 323, via a different network connection. For example, one application server 400₁ might be coupled via the network 314 (e.g., the Internet), another application server 400$_{N-1}$ might be coupled via a direct network link, and another application server 400$_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multi-tenant, wherein system 316 handles storage of, and access to, different objects, data and applications across disparate users and organizations.

As an example of storage, one tenant might be a company that employs a sales force where each salesperson uses system 316 to manage their sales process. Thus, a user might maintain contact data, leads data, customer follow-up data, performance data, goals and progress data, etc., all applicable to that user's personal sales process (e.g., in tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 316 might also maintain system level data usable by multiple tenants or other data. Such system level data might include industry reports, news, postings, and the like that are sharable among tenants.

In certain embodiments, user systems 312 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more SQL statements (e.g., one or more SQL queries) that are designed to access the desired information. System data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. An apparatus for user interface date selectors for historical reports, the apparatus comprising:
  a processor; and
  one or more stored sequences of instructions which, when executed by the processor, cause the processor to:
    cause a date selector to be displayed on a user interface, the date selector comprising a calculated dates option, wherein the calculated dates option provides a plurality of selectable numerical values and a plurality of selectable date ranges, each of the plurality of selectable numerical values representing an interval of days;

receive, via the date selector, a first selection of a first date range and one of the plurality of selectable numerical values of the interval;

identify each date within the first selected first date range based upon the selected numerical value of the interval, each of the identified dates having a plurality of associated data records, each data record including data corresponding with one of the identified dates;

cause a first display to be outputted, the first display including the date selector and each of the identified dates within the first selected date range chronologically as a preview of a historical report, the preview of the historical report being independent of data associated with each of the identified dates within the first selected date range;

receive, via the date selector in the first display that includes the preview of the historical report, a second selection of a second date range, the second date range being an expansion of the first date range;

identify each date within the second selected date range based upon the previously selected numerical value of the interval; and cause a second display to be outputted, the second display including each of the identified dates in chronological order within the first selected date range and the second selected date range as a second preview of the historical report, the second preview of the historical report being independent of data associated with each of the identified dates within the first selected date range and the second selected date range.

2. The apparatus of claim 1, wherein the date selector further comprises a fixed date option, and a relative date option.

3. The apparatus of claim 1, wherein the instructions, when executed by the processor, further cause the processor to:
receive by the user interface, a confirmation of the preview;
identify data records associated with each of the identified dates; and
output, by the user interface, the historical report comprising each of the identified dates and each of the plurality of data records associated with each of the identified dates in chronological order.

4. The apparatus of claim 1, wherein the historical report comprises data records associated with a current date and an indicator of a relative change between data records associate with a first date of the identified dates and data records associate with a second date of the identified dates.

5. A non-transitory machine-readable medium carrying one or more sequences of instructions for user interface date selectors for historical reports, which instructions, when executed by one or more processors, cause the one or more processors to:
cause a date selector to be displayed on a user interface, the date selector comprising a calculated dates option, wherein the calculated dates option provides a plurality of selectable numerical values and a plurality of selectable date ranges, each of the plurality of selectable numerical values representing an interval of days;
receive, via the date selector, a first selection of a first date range and one of the plurality of selectable numerical values of the interval;
identify each date within the first selected first date range based upon the selected numerical value of the interval, each of the identified dates having a plurality of associated data records, each data record including data corresponding with one of the identified dates;
cause a first display to be outputted, the first display including the date selector and each of the identified dates within the first selected date range chronologically as a preview of a historical report, the preview of the historical report being independent of data associated with each of the identified dates within the first selected date range;
receive, via the date selector in the first display that includes the preview of the historical report, a second selection of a second date range, the second date range being an expansion of the first date range;
identify each date within the second selected date range based upon the previously selected numerical value of the interval; and
cause a second display to be outputted, the second display including each of the identified dates in chronological order within the first selected date range and the second selected date range as a second preview of the historical report, the second preview of the historical report being independent of data associated with each of the identified dates within the first selected date range and the second selected date range.

6. The non-transitory machine-readable medium of claim 5, wherein the date selector further comprises a fixed date option, and a relative date option.

7. The non-transitory machine-readable medium of claim 5, wherein the instructions, when executed by one or more processors, further cause the one or more processors to:
receive by the user interface, a confirmation of the preview;
identify data records associated with each of the identified dates; and
output, by the user interface, the historical report comprising each of the identified dates and each of the plurality of data records associated with each of the identified dates in chronological order.

8. The non-transitory machine-readable medium of claim 5, wherein the historical report comprises data records associated with a current date and an indicator of a relative change between data records associate with a first date of the identified dates and data records associate with a second date of the identified dates.

9. A method for user interface date selectors for historical reports, the method comprising:
causing a date selector to be displayed on a user interface, the date selector comprising a calculated dates option, wherein the calculated dates option provides a plurality of selectable numerical values and a plurality of selectable date ranges, each of the plurality of selectable numerical values representing an interval of days;
receiving, via the date selector, a first selection of a first date range and one of the plurality of selectable numerical values of the interval;
identifying each date within the first selected first date range based upon the selected numerical value of the interval, each of the identified dates having a plurality of associated data records, each data record including data corresponding with one of the identified dates;
causing a first display to be outputted, the first display including the date selector and each of the identified dates within the first selected date range chronologically as a preview of a historical report, the preview of the historical report being independent of data associated with each of the identified dates within the first selected date range;

receiving, via the date selector in the first display that includes the preview of the historical report, a second selection of a second date range, the second date range being an expansion of the first date range;

identifying each date within the second selected date range based upon the previously selected numerical value of the interval; and causing a second display to be outputted, the second display including each of the identified dates in chronological order within the first selected date range and the second selected date range as a second preview of the historical report, the second preview of the historical report being independent of data associated with each of the identified dates within the first selected date range and the second selected date range.

10. The method of claim 9, wherein the date selector further comprises a fixed date option, and a relative date option.

11. The method of claim 9, wherein the method further comprises:

receiving, by the user interface, a confirmation of the preview;

identifying data records associated with each of the identified dates; and outputting, by the user interface, the historical report comprising each of the identified dates and each of the plurality of data records associated with each of the identified dates in chronological order.

12. The method of claim 9, wherein the historical report comprises data records associated with a current date and an indicator of a relative change between data records associate with a first date of the identified dates and data records associate with second date of the identified dates.

13. A method for transmitting code for user interface date selectors for historical reports, the method comprising:

transmitting code to cause a date selector to be displayed on a user interface, the date selector comprising a calculated dates option, wherein the calculated dates option provides a plurality of selectable numerical values and a plurality of selectable date ranges, each of the plurality of selectable numerical values representing an interval of days;

transmitting code to receive, via the date selector, a first selection of a first date range and one of the plurality of selectable numerical values of the interval;

transmitting code to identify each date within the first selected first date range based upon the selected numerical value of the interval, each of the identified dates having a plurality of associated data records, each data record including data corresponding with one of the identified dates;

transmitting code to cause a first display to be outputted, the first display including the date selector and each of the identified dates within the first selected date range chronologically as a preview of a historical report, the preview of the historical report being independent of data associated with each of the identified dates within the first selected date range;

transmitting code to receive, via the date selector in the first display that includes the preview of the historical report, a second selection of a second date range, the second date range being an expansion of the first date range;

transmitting code to identify each date within the second selected date range based upon the previously selected numerical value of the interval; and transmitting code to cause a second display to be outputted, the second display including each of the identified dates in chronological order within the first selected date range and the second selected date range as a second preview of the historical report, the second preview of the historical report being independent of data associated with each of the identified dates within the first selected date range and the second selected date range.

14. The method for transmitting code of claim 13, wherein the date selector further comprises a fixed date option, and a relative date option.

15. The method for transmitting code of claim 13, wherein the method further comprises:

transmitting code to receive, by the user interface, a confirmation of the preview;

transmitting code to identify data records associated with each of the identified dates; and transmitting code to output, by the user interface, the historical report comprising each of the identified dates and each of the plurality of data records associated with each of the identified dates in chronological order.

16. The method for transmitting code of claim 13, wherein the historical report comprises data records associated with a current date and an indicator of a relative change between data records associate with a first date of the identified dates and data records associate with a second date of the identified dates.

* * * * *